Jan. 9, 1968 J. B. RIDDLE ET AL 3,362,532

APPARATUS FOR RECOGNIZING PRINTED CURRENCY

Original Filed Aug. 23, 1961 2 Sheets-Sheet 1

*INVENTORS*
JOHN B. RIDDLE
ARNDT B. BERGH
CHARLES O. FORGE

BY *Naylor & Neal*
ATTORNEYS

Jan. 9, 1968 J. B. RIDDLE ET AL 3,362,532

APPARATUS FOR RECOGNIZING PRINTED CURRENCY

Original Filed Aug. 23, 1961 2 Sheets-Sheet 2

INVENTORS
JOHN B. RIDDLE
ARNDT B. BERGH
CHARLES O. FORGE

BY Naylor & Neal
ATTORNEYS

United States Patent Office 3,362,532
Patented Jan. 9, 1968

3,362,532
APPARATUS FOR RECOGNIZING PRINTED CURRENCY

John B. Riddle, Los Altos Hills, Arndt B. Bergh, Palo Alto, and Charles O. Forge, Cupertino, Calif., assignors to Micro-Magnetic Industries, Inc., Palo Alto, Calif.
Original application Aug. 23, 1961, Ser. No. 149,799, now Patent No. 3,280,974, dated Oct. 25, 1966. Divided and this application Sept. 2, 1966, Ser. No. 578,109
6 Claims. (Cl. 209—73)

ABSTRACT OF THE DISCLOSURE

This application discloses devices for recognizing United States paper money by recognizing the spacings of both vertical and horizontal grid lines in the backgrounds of the President's portraits on such money.

*Related applications*

Figure 1:
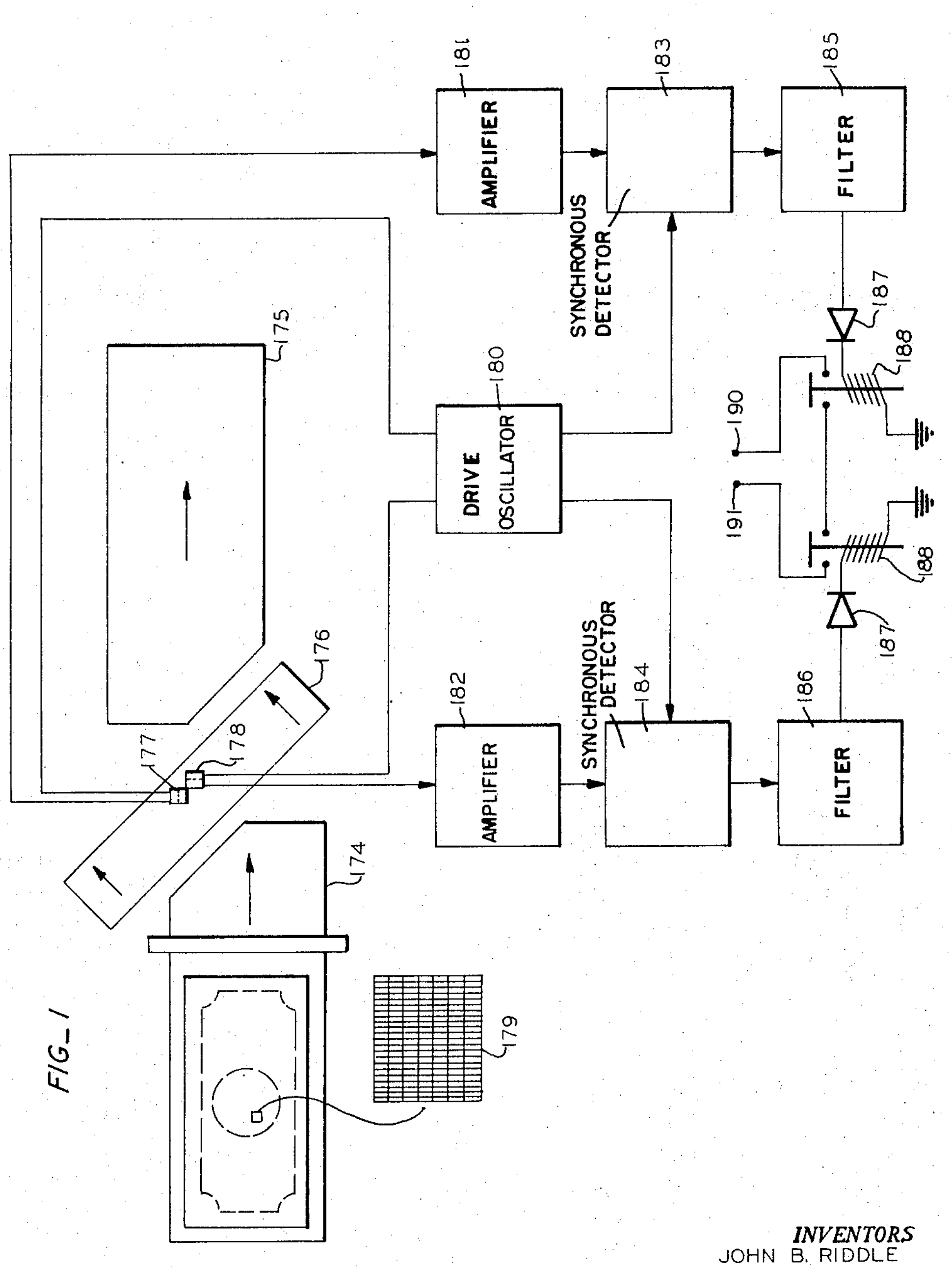

This application is a division of our earlier filed applications Ser. No. 149,799, filed Aug. 23, 1961, now U.S. Patent No. 3,280,974.

This invention relates to apparatus for recognizing printed matter in which the printed matter has a predetermined pattern indicia on a face thereof.

It is a principal object of the invention to provide apparatus for identifying printed matter by sensing the pattern of printed indicia on pieces of such printed matter.

It is another object of the invention to provide such apparatus for identifying printed matter which is sensitive to the existence or non-existence of very small fragments of the pattern of indicia on printed matter.

It is another object of the invention to provide such apparatus for identifying printed matter which is sensitive to the existence of these small fragments of indicia and which recognizes pieces of printed matter responsive to recognition of a sequence of these fragments.

It is another object of the invention to provide such apparatus for identifying printed matter which employs a detection element movable with respect to pieces of printed matter and adapted to generate an electrical signal responsive to the existence or non-existence of such very small fragments of the pattern of indicia on the printed matter.

It is another object of the invention to provide such apparatus in which the electrical signal is generated by the detection element only when the small fragment of the pattern of indicia adjacent to the detection element is non-uniform, so that no signal will be generated by the detection element when it is moved with respect to a completely uniform piece of printed matter or a blank piece on which no printing appears.

It is another object of the invention to provide apparatus for identifying printed matter in which a detection element scans the pattern of indicia on a piece of printed matter and in which the detection element sees only the smallest possible fragment of the pattern of indicia at each instant while it is scanning the pattern whereby the detection element sees the pattern in maximum detail.

It is another object to provide apparatus for identifying the validity of pieces of printed currency of a given denomination by scanning the currency with a detector, such as a magnetic flux detector head for detecting magnetized ink on the currency, an optical fiber for detecting illuminated areas of the printed pattern on the currency, a heat sensitive element for detecting heated ink on the currency, etc.

It is another object of the invention to provide such apparatus for identifying printed matter which is simple and economical to make and dependable and trouble free in use, yet which will be sufficiently complex as to prevent all attempts to intentionally make it identify undesirable pieces of printed matter.

It is another object of the invention to provide apparatus for identifying printed matter which is sensitive to the quality of the ink with which a pattern of indicia is printed on such printed matter.

It is another object of the invention to provide apparatus of this type which is particularly well suited for identifying printed currency.

It is another object of the invention to provide apparatus of the greatest reliability for recognizing the validity and denomination of pieces of printed currency.

It is another object of the invention to provide such apparatus for recognizing the validity and denomination of pieces of printed currency which will be able to recognize all valid bills of a given denomination regardless of any differences between them caused by excessive use or the fact that they were printed at different times from different plates.

It is another object of the invention to provide such apparatus for recognizing all valid bills of a given denomination but which will refuse to recognize invalid bills and valid bills of other denominations.

It is another object of the invention to provide such apparatus for recognizing currency which will recognize all of the bills of a plurality of denominations rejecting all other pieces of printed matter and which will distinguish between the bills of the different denominations which it recognizes.

It is another object of the invention to provide such apparatus for recognizing currency which will refuse to recognize fractions of valid pieces of currency.

It is another object of the invention to provide apparatus for recognizing the validity and denomination of printed currency by magnetizing the ink on said currency and then analyzing the pattern of magnetic flux adjacent to the printed indicia on the currency.

It is another object of the invention to provide such currency recognition apparatus in which means are provided for magnetizing the ink on bills in a direction perpendicular to the face of the bill and then moving the face of the bill past a magnetic flux measuring device, or magnetometer, to produce a detection signal from the magnetometer which is a parameter of the flux sensed by the magnetometer while the bill moves with respect thereto.

As used herein the term "magnetometer" means a device for statically sensing magnetic flux in space and generating an electrical signal which is a parameter of the flux sensed. The magnetometer contains a head portion for sensing static flux in a local area of space and a power means portion connected to the magnetometer for generating an electrical signal which is a parameter of the flux sensed by the head portion. The magnetometer is thus to be distinguished from what may be called a "dynamic head" which is a magnetic measuring device which generates an electrical signal as a parameter of the rate of movement of static magnetic flux adjacent to the device, the movement of flux resulting from the movement of the dynamic head in a static magnetic field, the movement of a magnetic field past a stationary dynamic head, etc. The use of the magnetometer instead of a "dynamic head" greatly reduces control and synchronization problems in the device, since with a magnetometer, an unknown bill may be examined and correlated to a known counterpart in space without reference to time whereas the use of a dynamic head may require accurate correlation with space and time.

It is another object of the invention to provide such apparatus in which, at each instant while the magnetized bill moves with respect to the magnetometer, the magnetometer measures magnetic flux from only a very small fragment of the pattern of indicia on the bill so that the magnetometer sees the pattern of indicia with maximum detail.

It is another object of the invention to provide an improved flux sensing head portion for the magnetometer used in apparatus of this type whereby the head portion will be able to see greater detail in a pattern of printed indicia than has been possible heretofore.

It is another object of the invention to provide apparatus for recognizing the validity and denomination of printed currency in which means are provided for magnetizing the ink on currency in a direction perpendicular to the face of the currency and then move the currency with respect to a magnetometer which will generate a detection signal which is a parameter of the pattern of indicia.

It is another object of the invention to provide such apparatus in which the magnetometer has extreme sensitivity both in its ability to detect minute quantities of magnetic flux and in its ability to detect such quantities of flux emanating from minute physical areas.

Other objects and advantages of the invention and the inventive subcombinations thereof will become apparent from the following detailed description of several specific devices which may be employed in the practice of the principles of the invention, these specific devices being indicative however of but a few of the many ways in which the principles of the invention may be employed.

Figure 2:
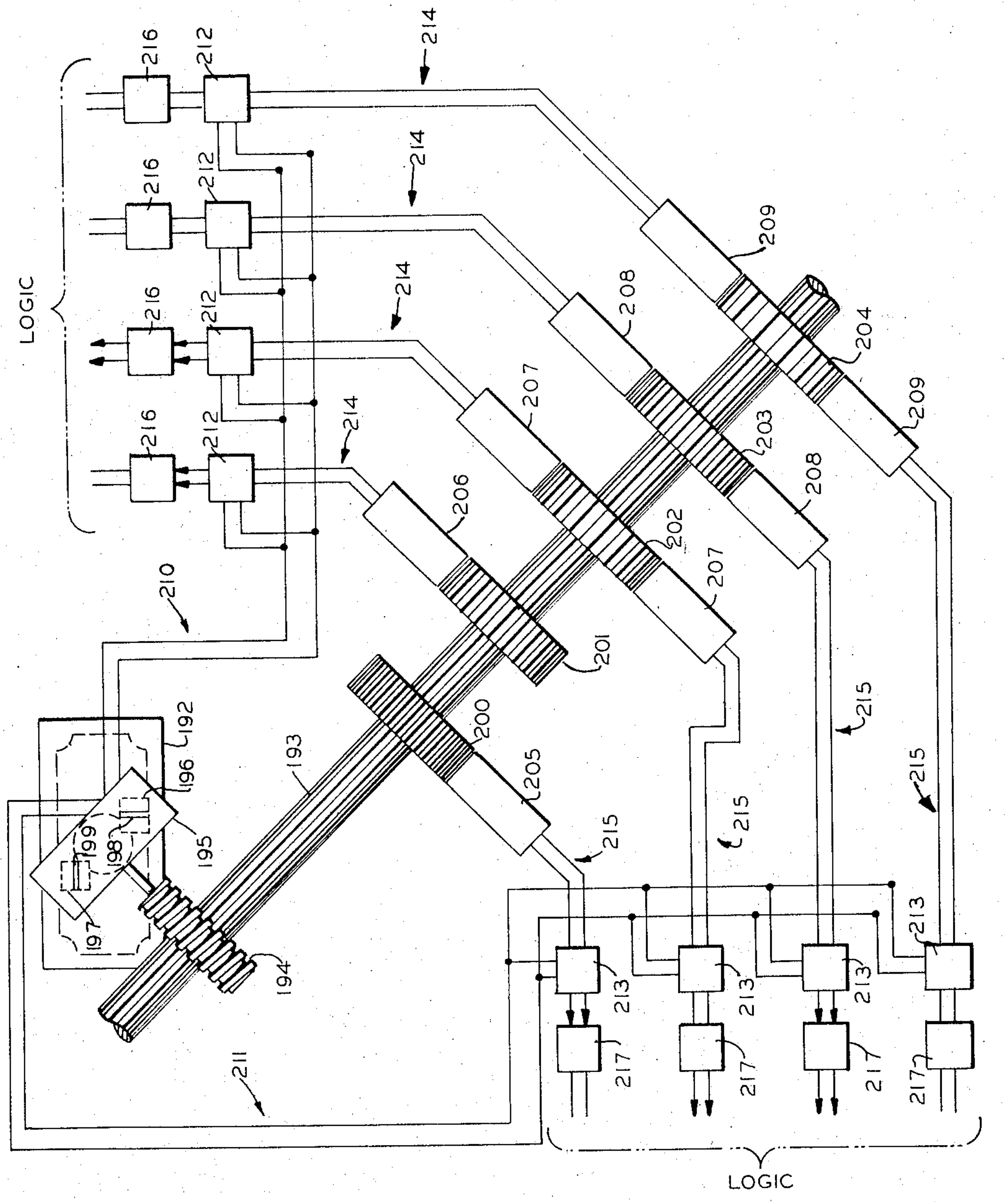

In the attached drawings:

FIG. 1 is a schematic diagram of a system of the invention in which two magnetic flux measuring heads are employed to examine the fine-lined background of the picture on a bill; and FIG. 2 is a schematic diagram of an alternative system of the invention similar to the system of FIG. 1 but employing dynamic flux detection instead of static detection.

Referring to FIG. 1, there is shown therein a schematic drawing of a system of this invention with which magnetic flux sensing heads may be used to recognize paper currency. In FIG. 1 a pair of parallel and laterally spaced conveyors 174 and 175 are positioned adjacent to a diagonal conveyor 176 which may be in the form of a roller with its axis inclined to the direction of movement of the conveyors 174 and 175, etc. The direction of movement of material across the conveyor 176 should be inclined at substantially an angle of 45° to the direction of movement of the conveyor 174. This proper inclination together with means for aligning the long edges of a piece of printed currency with the direction of movement of the conveyor 174 provides efficient means for positioning such a piece of currency on the conveyor 176 with the piece of currency moving at an angle of 45° to its long dimension. Mounted over the conveyor 176 are a pair of magnetic flux sensing heads 177 and 178 substantially similar to the flux sensing heads illustrated in FIGS. 7–9 of our Patent No. 3,280,974. However, the apertures 91 (see FIG. 7 of our patent) in the heads 177 and 178 are substantially perpendicular to each other and each inclined at an angle of 45° to the direction of movement of currency on the conveyor 176.

It should be here noted that all of the denominations of United States currency which it would be desirable to recognize with apparatus of this type have a picture of a United States president on the face thereof, and the backgrounds in these pictures are made from grids of parallel lines with one group of lines in each background extending parallel to the long dimension of the currency and with another group of such parallel lines extending perpendicular to the long dimension of the currency. This type of pattern is illustrated in the symbolic enlarged portion 179 in FIG. 1. While these grids of interesting lines in the backgrounds of the Presidents' pictures are similar to the naked eye when viewing United States bills of different denominations, it has been found that in fact the patterns are measurably different. For each denomination of United States currency this background cross-hatching appears to have a constant spacing between the lines which extend the length of the bill and a different constant spacing between the lines which extend the width of the bill and most important, the same combination of spacings between longitudinal and transverse lines in this cross-hatching is not found on bills of different denominations.

Accordingly, when a bill of a given denomination is moved along the apparatus illustrated symbolically in FIG. 1, the longitudinal lines will move across the conveyor 176 while they are maintained parallel to the elongated aperture 91 in the flux measuring head 177 and the transverse lines in the grid will be moved across the conveyor 176 while they are maintained parallel to the aperture 91 in the flux sensing head 178. The result of this orientation is the fact that the flux sensing head 177 senses a sequence of the longitudinal lines moving past it at one frequency while the flux sensing head 178 senses a sequence of the transverse lines moving past it at a second frequency. The flux sensing heads 177 and 178 do not see, or sense, the lines moving perpendicular to them because the head sees these lines as a uniform field; these perpendicular lines extend continuously across the apertures 91 in the heads and hence do not effect any noticeable change in the flux sensed through the apertures.

In the system illustrated in FIG. 1 the two heads 177 and 178 are driven by a common head drive oscillator 180 and have their outputs connected to separate amplifiers 181 and 182 respectively. The amplifiers are connected to synchronous detectors which convert the amplified alternating current signals into alternating current signals having the frequency with which the ranks and files of lines move past the heads 177 and 178. These signals of different predetermined frequencies are then passed through band pass filters 185 and 186, rectifiers 187 and the coils 188 of a pair of relays. The switch terminals of the two relays are connected in series whereby an electrical circuit is completed between output terminals 190 and 191 when the magnetic flux sensing heads 177 and 178 sense the predetermined frequencies of the band pass filters 185 and 186 simultaneously.

Referring finally to FIG. 2, the system shown therein comprises suitable means (not shown) for supporting a bill 192 in a fixed position and power means for rotating an elongated gear shaft 193. A worm gear 194 in mesh with gear shaft 193 rotates a cylindrical drum 195. A pair of dynamic magnetic pickup heads 196 and 197 are imbedded in the drum 195 with the gaps 198 and 199 of the heads 196 and 197 respectively extending perpendicular to each other and inclined at angles of 45° to radial planes of the drum 195. The drum 195 is mounted over the picture portion of the bill 192 with the axis of rotation of the drum inclined at an angle of 45° to the long dimension of the bill 192 so that rotation of the drum effects vertical sweeping of the gap 199 across the picture portion and horizontal sweeping of the gap 198 across the picture portion. As a result of this sweeping, the head 196 generates a signal the frequency of which is a function of the rotational speed of shaft 193 and the spacing between vertical lines in the background (see 179 in FIG. 1) of the picture on the bill; this signal is not influenced by the horizontal lines because horizontal lines appear uniform to the gap 198 as explained above. Similarly, as a result of this sweeping, the head 197 produces a signal the frequency of which is a function of the rotational speed of shaft 193 and the spacing between the horizontal lines in the background of the picture.

A plurality of multilobed gears 200–204 are rigidly mounted on the shaft 193 rotatable therewith, and an inductive pickup 205–209 respectively is mounted adjacent to the periphery of each gear 202–204. The inductive pickups 205–209 produce electrical signals the frequencies of which are functions of the rotational speed of shaft 193 and the numbers of teeth on the gears 200–204 respectively. A gear 200–204 is provided and the number of teeth thereon chosen to correspond to a number of lines-per-inch (horizontal or vertical) found in the background of the picture on a valid piece of currency so that two of the pickups 205–209 will generate signals of approximately the same frequency as the heads 196 and 197 when a valid piece of currency is examined. It should here be noted that the rotational speed of the shaft 193 is not critical since increasing the speed of the shaft increases the frequencies of the detection signals and the counterpart signals which are generated by the pickups 205–209.

The detection signals from heads 196 and 197 are conducted by lines 210 and 211 respectively to amplifier mixers 212 and 213 respectively, suitable collector rings (not shown) being provided on the drum 195 for connecting the leads 210 and 211 to the heads 196 and 197. The counterpart signals from the inductive pickups 205–209 are also conducted to the amplifier mixers 212 and 213 by leads 214 and 215 respectively so that when a detection signal and a counterpart signal of similar frequency was conducted to the same amplifier mixer, the amplifier mixer will deliver an output having beats at a frequency equal to the difference between the frequencies of the detection and counterpart signals. These outputs of amplifier mixers 212 and 213 are conducted to low frequency band pass filters 216 and 217 respectively which pass current only when the differences between the frequencies of their associated detection and counterpart signals are small. The filters 216 and 217 may be connected to rectifiers and relays paired in series as shown in FIG. 1 to recognize a particular denomination bill when the proper filter 216 and the proper filter 217 conduct substantially simultaneously.

While a number of specific features of this invention have been illustrated and described in detail herein, it is obvious that many modifications in the structure disclosed may be made without departing from the spirit and scope of the invention.

Accordingly, what is claimed is:

1. Apparatus for recognizing the validity and denomination of United States printed currency which comprises: magnetizing means establishing a magnetic field for magnetizing ink on pieces of said currency, magnetic detection means mounted in fixed space relation with said magnetizing means for detecting magnetized ink on pieces of said currency and effecting generation of an electrical detection signal as said detection means and a magnetized piece of said currency are moved with respect to each other with said detection signal being a parameter of the pattern of magnetized ink on said piece of currency, transport means adjacent to said magnetizing and detection means for moving said magnetizing and detection means and pieces of said currency with respect to each other while said detection means effects generation of detection signals corresponding to said pieces, and electrical recognition means connected to said detection means for recognizing pieces of said currency responsive to predetermined detection signals, said detection means comprising a pair of magnetic detection heads having elongated gaps therein with said heads rigidly mounted together with their gaps extending perpendicular to each other, and said transport means comprising means for moving the picture portion of a piece of currency with respect to said heads along a direction inclined at an angle of about 45° to the lengths of said gaps and with said long dimension of said piece of currency maintained parallel to the length of one of said gaps.

2. The apparatus of claim 1 in which said detection means comprise two magnetometers having head portions consisting of said magnetic heads and power means portions connected to said head portions for generating electrical signals which are parameters of the magnetic flux sensed by said head portions, said head portions having magnetic conductors which define said gaps and sense the static rates of change of magnetic field adjacent to said gaps measured perpendicular to the lengths of said gaps.

3. The apparatus of claim 1 in which said heads measure dynamic flux moving past said gaps; said recognizing means includes electrical frequency recognizing means connected to said heads and mechanical drive means for controlling the recognizing means are physically connected to said transport means for controlling the recognizing frequencies of said frequency recognizing means as a function of the speed of movement of said pieces of currency with respect to said heads.

4. Apparatus for recognizing United States paper money by recognizing the patterns of fine lines in the background of the Presidents' portraits on such money which comprises: first detection means for detecting the vertical lines in the background of a President's portrait on U. S. printed money, second detection means for detecting the horizontal lines in the background of a President's portrait on U.S. paper money, transport means for moving said first detection means with respect to U.S. paper money in a direction which has a component of motion parallel to the length of such money and for moving said second detection means with respect to paper money in a direction which has a component of motion parallel to the width of such money whereby said first detection means generates a first electrical signal having a frequency which is proportional to the line spacing between the vertical lines in such portrait background and said second detection means generates a second electrical signal having a frequency which is proportional to the spacing between the horizontal lines in said picture background, recognizing means connected to said first detection means for recognizing an electrical signal of a first predetermined frequency generated by said first detection means, recognizing means connected to said second detection means for recognizing an electrical signal of a second predetermined frequency generated by said second detection means, and currency acceptance means connected to said first and second recognizing means for accepting a piece of paper money responsive to operation of said first and second recognizing means.

5. The apparatus of claim 6 characterized further in that said transport means comprises means holding said first and second magnetic detection means in fixed space relation with respect to each other, and means for moving said detection means with respect to paper money along a path which is inclined to both the length and the width of said money, and said acceptance means comprises means for accepting money only when said first and second recognizing means recognized said first and second electrical signals simultaneously.

6. The apparatus of claim 4 characterized further in that said first detection means comprises magnetic detection means and said second detection means comprises magnetic detection means.

References Cited

UNITED STATES PATENTS

| | | | |
|---|---|---|---|
| 3,245,534 | 4/1966 | Smith et al. | 209—111.8 |
| 3,275,138 | 9/1966 | Cahill | 209—111.8 |

ALLEN N. KNOWLES, *Primary Examiner.*